United States Patent
Nakamura

(10) Patent No.: US 11,917,279 B2
(45) Date of Patent: Feb. 27, 2024

(54) OPTICAL APPARATUS INCLUDING LENS PORTIONS AND FILTERS, AND IMAGE PICKUP SYSTEM INCLUDING THE SAME

(71) Applicant: CANON KABUSHIKI KAISHA, Tokyo (JP)

(72) Inventor: Tsubasa Nakamura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/745,720

(22) Filed: May 16, 2022

(65) Prior Publication Data

US 2022/0279098 A1     Sep. 1, 2022

Related U.S. Application Data

(62) Division of application No. 16/594,968, filed on Oct. 7, 2019, now abandoned.

(30) Foreign Application Priority Data

Oct. 16, 2018  (JP) .................................. 2018-195419

(51) Int. Cl.
  *H04N 23/55*    (2023.01)
  *G02B 7/02*     (2021.01)
  (Continued)

(52) U.S. Cl.
  CPC ........... *H04N 23/55* (2023.01); *G02B 3/0037* (2013.01); *G02B 5/201* (2013.01); *G02B 7/006* (2013.01);
  (Continued)

(58) Field of Classification Search
  CPC ............ H04N 5/2254; H04N 5/23225; H04N 5/2258; G02B 7/006; G02B 5/201;
  (Continued)

(56) References Cited

U.S. PATENT DOCUMENTS

| 8,014,666 B2 * | 9/2011 | Neiman ................. G03B 17/00 |
| | | 396/533 |
| 9,658,367 B2 * | 5/2017 | Sambongi ............ G02B 3/0043 |

(Continued)

FOREIGN PATENT DOCUMENTS

| JP | 2004-198439 A | 7/2004 |
| JP | 2007-243928 A | 9/2007 |

(Continued)

OTHER PUBLICATIONS https://www.amazon.com/77mm-Protection-Filter-Camera-Lens/dp/B004OVE188 2023.*

*Primary Examiner* — Hung H Lam
(74) *Attorney, Agent, or Firm* — Canon U.S.A., Inc IP Division

(57) ABSTRACT

An optical apparatus includes: a plurality of lens portions that forms respective images of an object; a plurality of filters disposed on respective optical axes of the plurality of lens portions; and a holding member holding the plurality of lens portions and the plurality of filters, in which the plurality of filters includes a first filter and a second filter mutually different in transmission characteristic, and in which the holding member includes a first mount portion and is detachably mountable to an imaging apparatus via the first mount portion.

17 Claims, 5 Drawing Sheets

(51) Int. Cl.
    *G02B 7/00*      (2021.01)
    *G02B 5/20*      (2006.01)
    *G02B 27/28*     (2006.01)
    *G02B 3/00*      (2006.01)
    *H04N 23/617*    (2023.01)

(52) U.S. Cl.
    CPC ........... *G02B 7/021* (2013.01); *G02B 27/288* (2013.01); *H04N 23/617* (2023.01)

(58) Field of Classification Search
    CPC .... G02B 27/288; G02B 3/0037; G02B 7/021; G02B 27/0075; G02B 13/16
    See application file for complete search history.

(56) References Cited

U.S. PATENT DOCUMENTS

| | | | |
|---|---|---|---|
| 2015/0234150 A1 | 8/2015 | Katsunuma | |
| 2016/0277658 A1* | 9/2016 | Kim | H04N 5/23229 |
| 2017/0192209 A1* | 7/2017 | Yamahiro | G02B 7/14 |
| 2018/0176488 A1* | 6/2018 | Dvir | G02B 23/18 |
| 2018/0302597 A1* | 10/2018 | Honda | H01L 27/14645 |

FOREIGN PATENT DOCUMENTS

| | | |
|---|---|---|
| JP | 2013-76719 A | 4/2013 |
| JP | 2014-75669 A | 4/2014 |
| JP | 2015-104058 A | 6/2015 |
| JP | 2015-130557 A | 7/2015 |
| JP | 2018-526664 A | 9/2018 |
| WO | 2013/179620 A1 | 12/2013 |

* cited by examiner

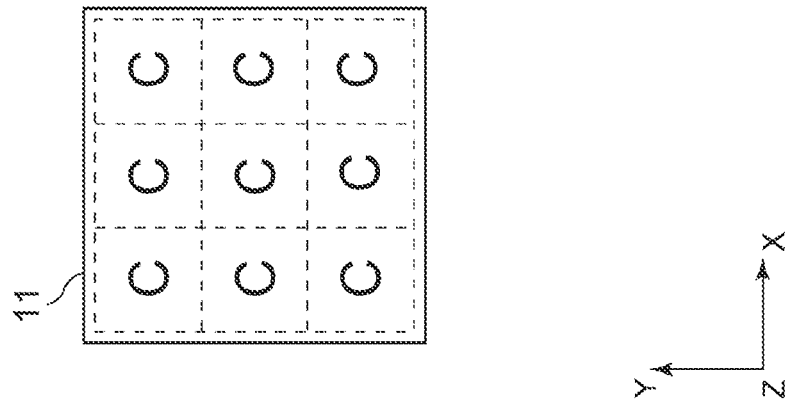
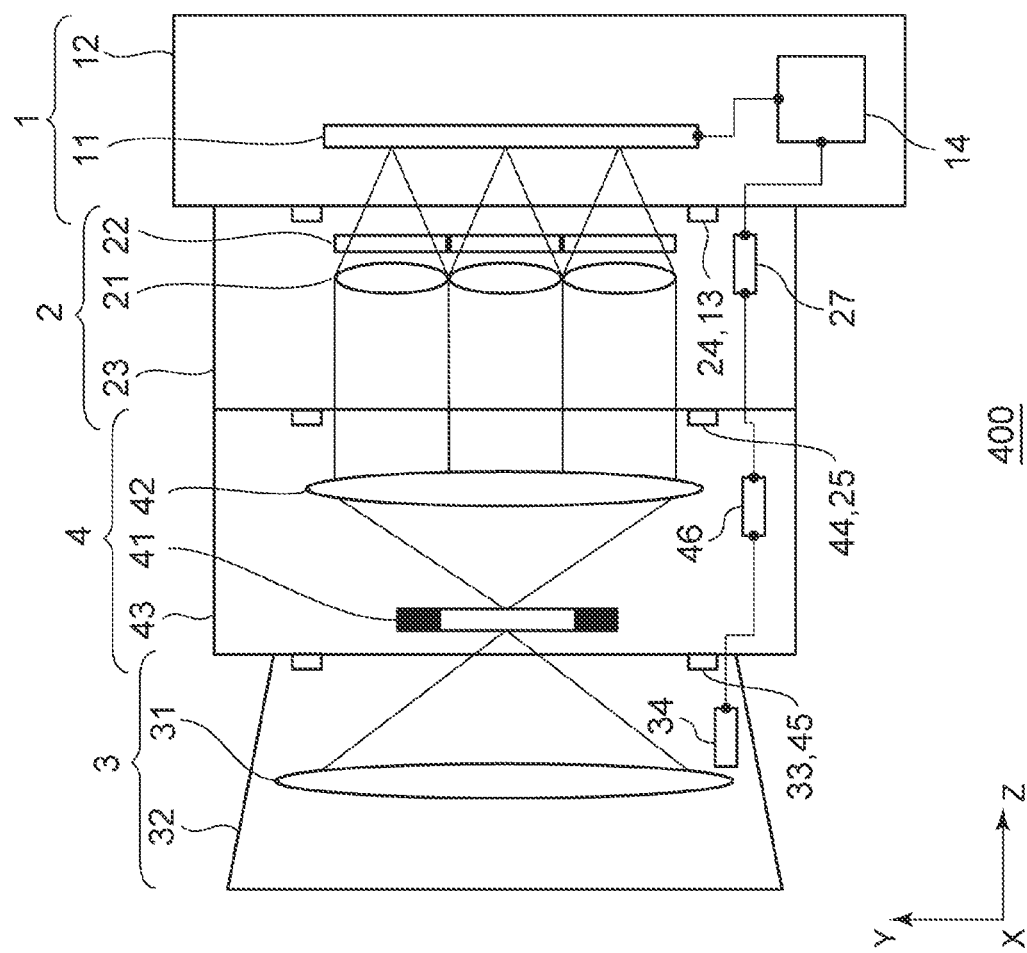

OPTICAL APPARATUS INCLUDING LENS PORTIONS AND FILTERS, AND IMAGE PICKUP SYSTEM INCLUDING THE SAME

CROSS-REFERENCE TO RELATED APPLICATION

This application is a Divisional of U.S. application Ser. No. 16/594,968, filed Oct. 7, 2019, which claims priority from Japanese Patent Application No. 2018-195419, filed Oct. 16, 2018, which are hereby incorporated by reference herein in their entireties.

BACKGROUND OF THE INVENTION

Field of the Invention

The aspect of the embodiments relates to an optical apparatus including a plurality of lens portions that forms respective images of an object, and is suitable for an image pickup system, such as a digital still camera or a video camera.

Description of the Related Art

It has been known that an optical apparatus for an imaging apparatus forms a plurality of images of the same object (subject) with a plurality of lenses. In such an optical apparatus, a plurality of filters mutually different in transmission characteristic, is provided on the respective optical axes of the plurality of lenses, so that a plurality of mutually different pieces of image information can be acquired simultaneously by a one-time image pickup.

US 2015/0234150 discloses an imaging device including a plurality of lenses and a plurality of filters, in which a holding member holding the plurality of filters is detachably mountable to the imaging device. According to this configuration, each filter is replaced so as to be different in transmission characteristic, so that acquirable image information can be changed.

However, replacement of each filter in the configuration disclosed in US 2015/0234150, is likely to cause light that enters each lens, to vary in state or wavelength or to cause the relative position between each filter and each lens, to vary. In this case, each lens varies in aberration or focus, so that favorable image information is unlikely to be acquired.

SUMMARY OF THE INVENTION

An optical apparatus includes: a plurality of lens portions configured to form respective images of an object; a plurality of filters disposed on respective optical axes of the plurality of lens portions; and a holding member holding the plurality of lens portions and the plurality of filters, wherein the plurality of filters includes a first filter and a second filter mutually different in transmission characteristic, and wherein the holding member includes a first mount portion and is detachably mountable to an imaging apparatus via the first mount portion.

Further features of the disclosure will become apparent from the following description of exemplary embodiments (with reference to the attached drawings).

BRIEF DESCRIPTION OF THE DRAWINGS

FIG. 5A is a main schematic view of an image pickup system according to a fourth embodiment (YZ cross section).

FIG. 5B is a front view of an image pickup surface of the image pickup system according to the fourth embodiment.

DESCRIPTION OF THE EMBODIMENTS

Figure 1A:
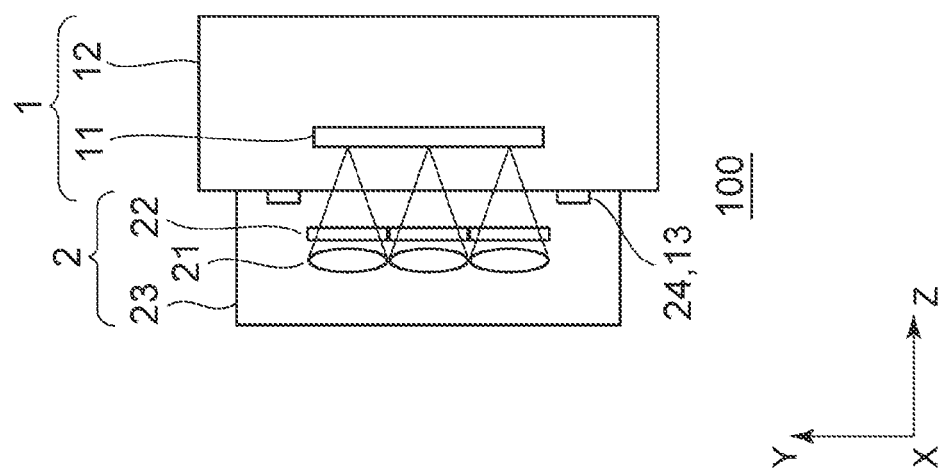
FIG. 1A is a main schematic view of an image pickup system according to a first embodiment (YZ cross section).

An exemplary embodiment of the disclosure will be described below with reference to the drawings. Note that, for convenience, in some cases, the scale of each drawing is different from the actual scale. The same members are denoted with the same reference signs in the drawings, and the duplicate descriptions thereof will be omitted.

First Embodiment

Figure 1B:
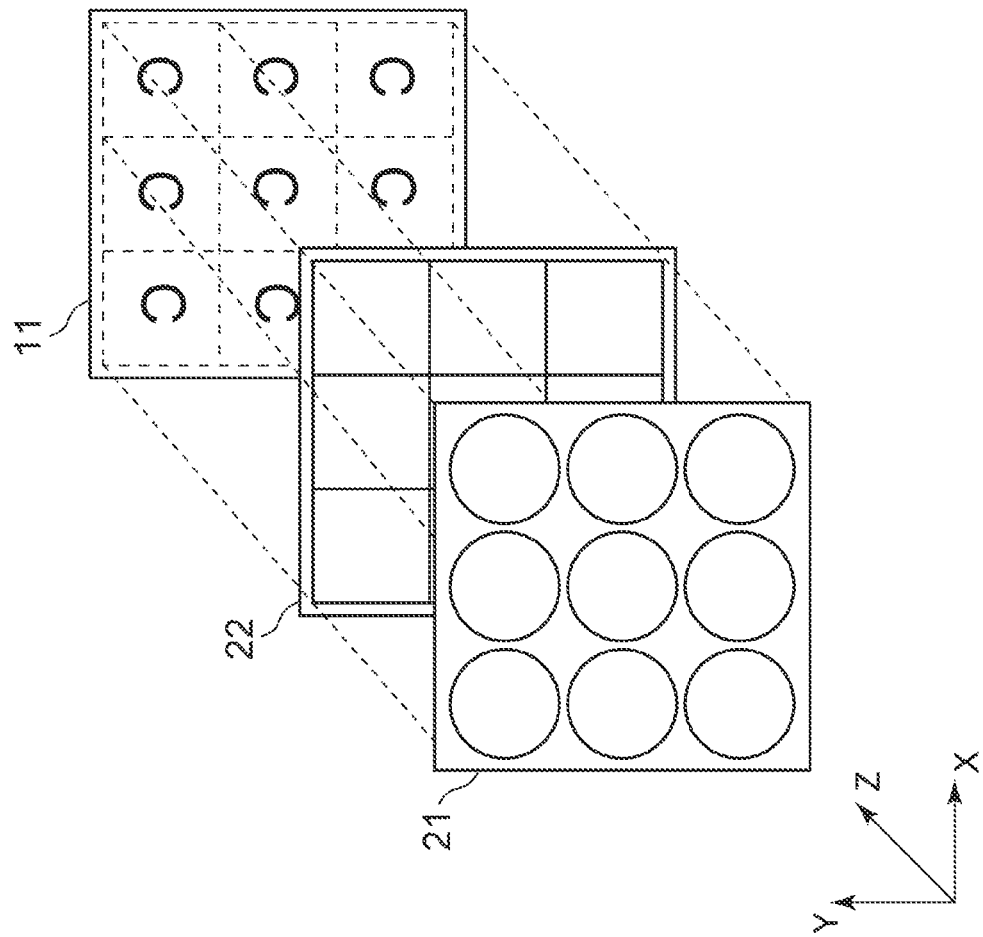
FIG. 1B is a view of the positional relationship between each member in the image pickup system according to the first embodiment.

FIGS. 1A and 1B are main schematic views (exemplary views) of an image pickup system 100 according to a first embodiment of the disclosure. FIG. 1A illustrates a cross section (YZ cross section) including part of the optical axes of a plurality of lens portions to be described later. The optical axis herein indicates an axis passing through the center (vertex) of each optical surface (each lens surface) in each lens portion. FIG. 1A illustrates the marginal rays of on-axis light, condensed to the on-axis image height of each lens portion. FIG. 1B illustrates the positional relationship between each member in the image pickup system 100. Note that an object to be picked up not illustrated is disposed on the −Z side (object side) of the image pickup system 100.

The image pickup system 100 includes: an imaging apparatus (camera unit) 1; and an optical apparatus (array unit) 2 disposed on the object side with respect to the imaging apparatus 1. The imaging apparatus 1 includes: an image pickup element (light-receiving element) 11 including an image pickup surface (light-receiving surface) disposed on the image plane of the optical apparatus 2; and a holding member (housing) 12 holding the image pickup element 11. The optical apparatus 2 includes: a lens array 21 consisting of the plurality of lens portions that forms respective images of the object; a filter array 22 consisting of a plurality of filters disposed on the respective optical axes of the lens portions; and a holding member (lens barrel) 23 holding the lens array 21 and the filter array 22.

As the image pickup element 11, a photoelectric conversion element, such as a CCD sensor or a CMOS sensor, can be adopted. The image pickup element 11 may photoelectrically convert, for example, infrared light (near-infrared light or far-infrared light) instead of visible light. For example, an image pickup element containing a material, such as Si, InGaAs, or InAsSb, may be adopted in accordance with a wavelength band for use. In one embodiment, the number of pixels of the image pickup element 11 is determined based on the resolution used in the image pickup system 100.

Each of the plurality of lens portions according to the present embodiment, consists of one lens or more. Each lens portion forms an image of the object onto the image pickup surface of the image pickup element 11. In other words, the plurality of lens portions forms a plurality of images of the object (image array) onto the image plane of the lens array 21. That is the lens array 21 is capable of reproducing the image of the same object. Note that the plurality of lens portions may be integrally formed for ease of production and arrangement, or may be separately formed in order to enable individual positional adjustment (e.g., focus adjustment).

The plurality of filers (optical filters) according to the present embodiment includes two filters or more mutually different in transmission characteristic. The transmission characteristic herein indicates an optical characteristic of varying the state of incident light, such as the wavelength band of transmissive light (transmissive wavelength region), the direction and type of transmissive polarization (polarization state), or the intensity of transmitted light to the intensity of incident light (transmittance). The filter array 22 consisting of a plurality of filters mutually different in transmission characteristic, enables simultaneous acquisition of a plurality of mutually different pieces of image information to the same object.

In one embodiment, the filter array 22 includes at least two filters mutually different in transmission characteristic (first and second filters). In other words, two filters or more mutually identical in transmission characteristic may be included. For example, in a case where the image pickup system 100 is used as a ranging apparatus (stereo camera), distance information regarding the object is acquired with two pieces of image information mutually different in parallax. Thus, two filters corresponding to the respective pieces of image information are substantially equivalent in transmission characteristic. Note that, in order to acquire a larger number of mutually different pieces of image information by a one-time image pickup, the plurality of filters is mutually different in transmission characteristic.

For example, use of a plurality of filters mutually different in the central wavelength of a transmissive wavelength region (bandpass filters), enables simultaneous acquisition of a plurality of pieces of image information corresponding to a plurality of wavelength bands. In this case, the image pickup system 100 functions as a multispectral camera capable of acquiring image information corresponding to four types of wavelength bands or more, larger in number than the wavelength bands (RGB) of a general camera. Furthermore, the image pickup system 100 functions as a hyperspectral camera capable of acquiring image information corresponding to 100 types of wavelength bands or more. Note that, instead of such a bandpass filter, a wavelength conversion filter that converts the wavelength of incident light to output the converted light, may be used.

Alternatively, use of a plurality of polarizing filters mutually different in type, enables simultaneous acquisition of a plurality of pieces of image information corresponding to a plurality of polarization states. For example, use of three linearly-polarizing filters and a circularly-polarizing filter can be considered, in which the three linearly-polarizing filters transmit respective linear polarizations parallel to the X direction (horizontal direction), the Y direction (vertical direction), and a direction at 45° to the X direction and the Y direction, and the circularly-polarizing filter transmits a circular polarization. In this manner, use of a plurality of types of polarizing filters that changes the polarization state of incident light, enables acquisition of polarization information, such as the polarization characteristic of the object (Stokes parameters) and the two-dimensional distribution of the polarization state of the object.

Note that the filter array 22 may consist of a plurality of filters different in type of transmission characteristic so that different types of information can be simultaneously acquired, such as wavelength information, polarization information, luminosity information, and parallax information. In this case, a plurality of filters mutually different in type is not limited to arrangement on the respective optical axes of lens portions mutually different, and thus may be disposed on the same optical axis. In the latter case, acquired image information is filtered by an image processing unit not illustrated, resulting in separation into different types of image information.

In general, the image pickup element 11 consisting of a silicon material for use in a visible wavelength band, is characteristically more sensitive to a central wavelength band (near 550 nm) than to a short wavelength band (450 nm or less) and a long wavelength band (750 nm or more). Therefore, in a case where a plurality of bandpass filters corresponding to the wavelength bands is used, a neutral density filter is disposed on the optical axis on which the bandpass filter corresponding to the central wavelength band is disposed. In this case, use of a polarizing filter as the neutral density filter enables not only correction of the balance in luminance between each piece of image information but also simultaneous acquisition of wavelength information and polarization information.

In order to acquire a plurality of desired pieces of image information by dispersion of light from the object, each lens portion and each filter are disposed in pairs. In other words, all the light having passed through one lens portion passes only through one type of filter disposed on the optical axis of the one lens portion. Note that the one type of filter herein includes a filter consisting of a plurality of filter elements disposed on the same optical axis. However, for a configuration in which only the filter array 22 is replaceable or for a configuration in which only the lens array 21 is replaceable, the correspondence relationship between each lens portion and each filter is unstable. Thus, favorable image information is unlikely to be acquired. For example, in a case where the size (effective diameter) or arrangement of each lens portion is changed by replacement of the lens array 21, the size or arrangement of each filter also changes so as to meet the change.

Chromatic aberration on the image plane of each lens portion varies due to the transmission characteristic of the corresponding bandpass filter. In accordance with the variation, the focal position or distortion aberration of each lens portion varies. For use of a filter different from the bandpass filter, optical performance is likely to vary in accordance with, for example, the anisotropy of each filter. Therefore, in a case where the transmission characteristic of each filter is changed by replacement of the filter array 22, the position or configuration (design) of each lens portion is changing so as to meet the change. Note that, even if the lens array 21 and the filter array 22 are individually replaceable and an appropriate combination thereof is selectable, favorable optical performance is unlikely to be acquired due to an error of the relative position therebetween.

Thus, according to the present embodiment, the holding member 23 holds the lens array 21 and the filter array 22 integrally, so that the relative position therebetween is inhibited from shifting. The holding member 23 includes a first mount portion (first coupling portion) 24 for coupling with the imaging apparatus 1. This arrangement enables the optical apparatus 2 as an accessory apparatus, to be detachably mounted onto the imaging apparatus 1 via the first mount portion 24. That is simultaneous replacement of the lens array 21 and the filter array 22 being integrally held can be made to the imaging apparatus 1.

This configuration enables change of the type or resolution of image information to be acquired, with the relative position between the lens array 21 and the filter array 22, being inhibited from shifting. Specifically, at replacement of the filter array 22 with a filter array different in transmission characteristic, simultaneously, the lens array 21 can be replaced with a lens array corresponding to (optimized to) the filter array. This arrangement enables each lens to be inhibited from varying in aberration or focus. Replacement of the lens array 21 with a lens array different in the number of lens portions, enables change of the resolution of the image pickup system 100. In this case, simultaneously, the filter array 22 can be replaced with a filter array corresponding to the lens array.

In this manner, the image pickup system 100 according to the present embodiment enables the optical apparatus 2 to be replaced in accordance with image information to be acquired. Particularly, because the lens array 21 is replaceable, an increase or decrease in the number of lens portions enables an increase or decrease in the type (e.g., the number of bands) and resolution of image information. Because the lens array 21 and the filter array 22 are integrally replaceable, optical performance can be inhibited from varying at replacement. This arrangement enables the common imaging apparatus 1 to acquire a plurality of favorable pieces of image information, simultaneously, regardless of the configuration of the optical apparatus 2.

The first mount portion 24 at least corresponds in shape to a mount portion 13 provided at the imaging apparatus 1. For example, a coupling portion (e.g., a protrusion, a recess, or a magnet) provided on a circumference surrounding the image pickup surface when viewed in the optical-axis direction (Z direction) can be adopted as the first mount portion 24. In FIG. 1A, the first mount portion 24 is indicated as a recess, and the mount portion 13 of the imaging apparatus 1 is indicated as a protrusion. However, the shape of each mount portion is not limited to this. In one embodiment, the first mount portion 24 is provided with an electrical contact (terminal) for electrical connection with the imaging apparatus 1. This arrangement enables the optical apparatus 2 to communicate with the imaging apparatus 1 or to receive electric power from the imaging apparatus 1, via the electrical contact.

Figure 2:
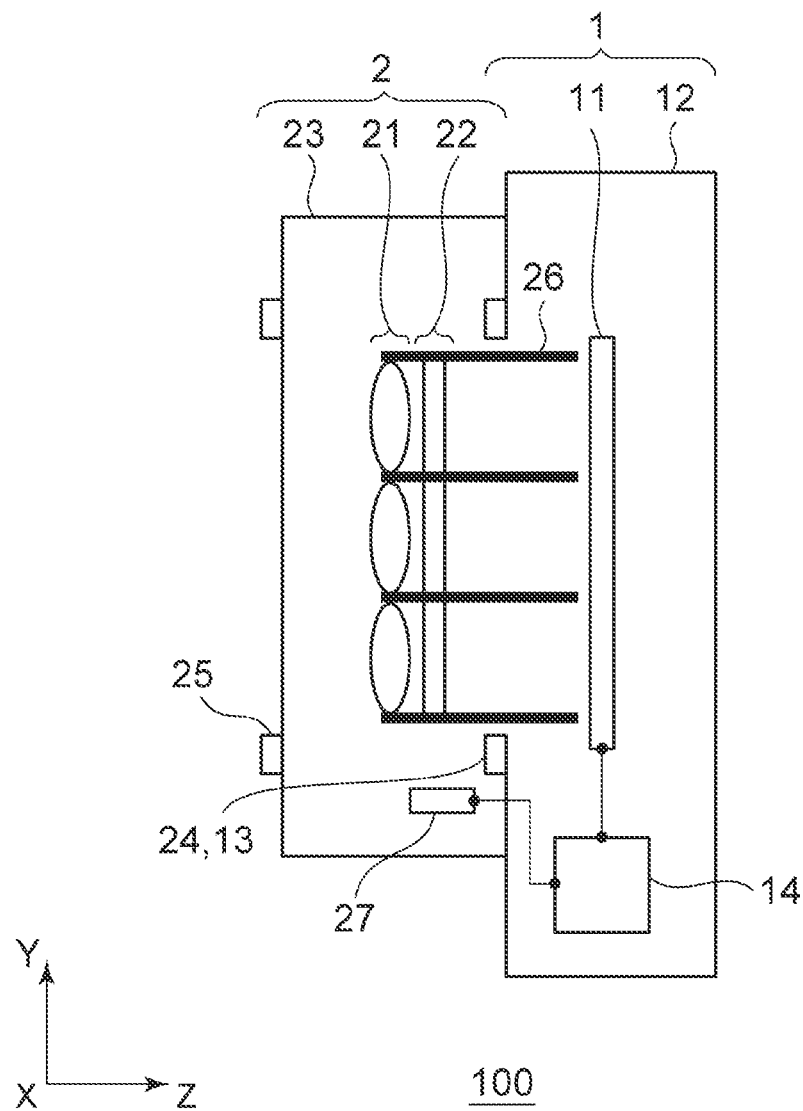
FIG. 2 is a main schematic view of an image pickup system according to a modification of the first embodiment.

Note that, as illustrated in FIG. 2, the holding member 23 may include a second mount portion (second coupling portion) 25 provided on the object side, in addition to the first mount portion 24 provided on the image side. This arrangement enables an accessory apparatus, such as a lens apparatus or an adaptor apparatus to be described later, to be detachably mounted onto the optical apparatus 2. In FIG. 2, the second mount portion 25 is indicated as a protrusion. However, the shape of the second mount portion 25 is not limited to this, and thus at least is to be set in accordance with the shape of a mount portion of the accessory apparatus to be mounted. Note that, the second mount portion 25 is provided with an electrical contact for communication with the accessory apparatus or supply of electric power to the accessory apparatus.

As illustrated in FIG. 1B, the optical apparatus 2 according to the present embodiment includes nine lens portions and nine filters disposed on the respective optical axes of the lens portions. That is, when an aggregate of a lens portion and a filter disposed on the same optical axis is defined as one image forming unit, the optical apparatus 2 includes nine image forming units. The plurality of image forming units is collectively called an image-forming-unit array. Note that the number of image forming units is not limited to this, and thus the optical apparatus 2 is to include at least two image forming units. Note that, in order to acquire image information corresponding to a larger number of transmission characteristics by a one-time image pickup, four image forming units or more are provided. In one embodiment, nine image forming units or more are provided as in the present embodiment.

Light from the object reaches the image pickup surface of the image pickup element 11 through the lens array 21 and the filter array 22 in this order. In this case, nine images (reproduced images) corresponding to the respective image forming units are formed on the image pickup surface. FIG. 1B illustrates images formed on the image pickup surface in a case where the object as a subject is, for example, a character of "C". An image-forming optical system included in the image pickup system 100 according to the present embodiment, consists of only the lens array 21 consisting of the plurality of lens portions each consisting of a single lens. Thus, each image results in an inverted image.

Note that, for miniaturization of the imaging apparatus 1, a common (single) image pickup element is provided to the lens portions, similarly to the image pickup element 11 according to the present embodiment. Use of the common image pickup element to the lens portions, enables acquisition of favorable image information even in a case where the number of lens portions or arrangement varies due to replacement of the optical apparatus 2. In this case, in order to improve the use efficiency of the image pickup element 11, a plurality of pixels (photodiodes) of which the image pickup element 11 consists is disposed uniformly with as small a gap as possible.

Note that, as necessary, each lens portion is provided with an individual image pickup element. In this case, for miniaturization of the entire apparatus, each image pickup element is disposed uniformly with as small a gap as possible. For miniaturization of the optical apparatus 2, each lens portion is disposed meeting the shape of the image pickup surface of the image pickup element 11. Specifically, as illustrated in FIG. 1B, each lens portion is disposed square in XY cross section. Note that, in a case where the image pickup surface of the image pickup element 11 is not square, for example, the arrangement of the lens portions may be changed in aspect ratio.

In FIG. 1B, the boundary between the plurality of images (image forming regions) on the image pickup surface of the image pickup element 11, is indicated with broken lines. Note that, for convenience, the broken lines indicate respective segments corresponding to the image forming units, on the image pickup surface, and thus are not structured actually. In a case where the respective boundaries of the images is sharpening as actually indicated with the broken lines, a stop member (light shielding member) corresponding to each image forming unit is provided. For example, as illustrated in FIG. 2, a light-shielding member 26 is provided on the respective boundaries of the image forming units, so that the image forming region corresponding to an image forming unit can be protected from entry of undesirable light (stray light) from an adjacent different image forming unit.

As described above, because the optical apparatus 2 according to the present embodiment is detachably mountable to the imaging apparatus 1, the light-shielding member 26 is held by the holding member 23 in the optical apparatus 2. At replacement of the lens array 21 and the filter array 22, this arrangement enables simultaneous replacement of the light-shielding member 26 corresponding to the lens array 21 and the filter array 22. In order to block undesirable light sufficiently, as illustrated in FIG. 2, the light-shielding member 26 extends close to the image pickup element 11 inside the imaging apparatus 1.

Note that, in FIG. 2, the light-shielding member 26 is disposed corresponding to the rectangular image forming regions indicated with the broken lines in FIG. 1B. However, the arrangement of the light-shielding member 26 is not limited to this, and thus at least corresponds to the arrangement of each image forming unit and the required shape of each image forming region. For example, each image forming region may be arbitrary in shape, such as circular, instead of being rectangular, or each image forming region may be different in size. Note that, in order to improve the use efficiency of the image pickup surface, as illustrated in FIG. 1B, the image pickup surface is equally segmented by each image forming region that is rectangular identically in size. Alternatively, in a case where the image forming units are arrayed in a honeycomb, the light-shielding member 26 at least has a honeycomb structure.

The arrangement order in the optical-axis direction of the lens array 21 and the filter array 22, is not limited to that illustrated in FIGS. 1A and 1B. For example, for use of an interference type of bandpass filter, in consideration of the angular characteristic (angular dependence) thereof, the filter array 22 is disposed on the object side with respect to the lens array 21 such that the incident angle of light is small to each filter. Note that, in a case where each lens portion in the lens array 21 has sufficient telecentric performance, even when the filter array 22 is disposed on the image side (+Z side) with respect to the lens array 21, the incident angle of light can be made small to each filter.

In a case where the filter array 22 is disposed on the object side with respect to the lens array 21, deficiency (vignetting) of off-axis rays that enter the lens array 21, is likely to occur. Therefore, for example, for use of a filter small in angular dependence, such as an absorption type of bandpass filter or for preference of the light use efficiency to the angular dependence of a filter, the filter array 22 is disposed on the image side with respect to the lens array 21.

When the optical apparatus 2 is mounted onto the imaging apparatus 1 in the image pickup system 100 according to the present embodiment, a mounting error occurs depending on the production accuracies of the respective mount portions thereof. Thus, an error is likely to occur in the positional relationship between the lens array 21, the filter array 22, and the image pickup element 11. Occurrence of such an error causes the lens array 21 to be out of focus on the image pickup surface of the image pickup element 11 (defocus). Thus, a moving mechanism for moving the lens array 21 in the optical-axis direction is provided so that the focus of the lens array 21 can be adjusted.

Alternatively, a moving mechanism for moving the image pickup element 11 in the optical-axis direction instead of moving the lens array 21 may be provided so that movement of the image pickup element 11 enables focus adjustment (sensor focus). Note that the lens array 21 having an image plane inclining with respect to the image pickup surface due to a mounting error of the optical apparatus 2, is likely to cause field curvature or out of focus differing every lens portion. Therefore, the inclination of the image pickup element 11 to the optical axes is changeable (tilt angle). Furthermore, movement of the image pickup element 11 in the direction including a vertical component to the optical axes, may enable image shake correction (hand shake correction).

Depending on the transmission characteristic of each filter of which the filter array 22 consists, the direction or the amount of shifting of out of focus occurring due to each lens portion differs from those due to the others. Therefore, the respective positions of the plurality of lens portions of which the lens array 21 are individually adjustable. In this case, adoption of a lens elongate in the optical-axis direction similar to a rod lens as each lens portion, enables stable holding of each lens portion. Thus, tilt decentering to the optical axis of each lens portion can be inhibited from occurring at adjustment.

Note that, for example, for chromatic aberration correction, in a case where each lens portion consists of a plurality of lenses disposed on the same optical axis, a lens barrel holding each lens portion (small-diameter lens barrel) is elongate in shape in the optical-axis direction. Thus, an effect similar to the above can be acquired. In this case, a peripheral portion (edge portion) located vertically to the optical axis inside each lens barrel, is coated with light-shielding paint or a light-shielding member is provided between adjacent lens barrels, so that stray light is inhibited from reaching the image pickup surface. For example, the light-shielding member 26 illustrated in FIG. 2 may be used as the lens barrels.

Next, a processing system in the image pickup system 100 will be described. As illustrated above, the characteristic of image information to be output from the image pickup element 11, varies due to the configuration of the optical apparatus 2 mounted on the imaging apparatus 1. Therefore, even when any optical apparatus 2 is mounted on the imaging apparatus 1, a system in which image information is appropriately processed is achieved. Specifically, the optical apparatus 2 includes a communication unit that transmits information to or receives information from the imaging apparatus 1 and a recognition unit that recognizes connection with the imaging apparatus 1.

FIG. 2 illustrates the imaging apparatus 1 including a processing unit 14 and the optical apparatus 2 including a processing unit 27. The processing unit 14 has a function as at least a communication unit and a recognition unit. The processing unit 27 has a function as at least a communication unit (storage unit). After the optical apparatus 2 is mounted on the imaging apparatus 1, the processing unit 14 and the processing unit 27 are electrically connected, so that mutual transmission and reception of information (signal) can be performed. The processing unit 14 and the processing unit 27 are capable of performing transmission and reception of information via the electrical contact provided at the mount portion of the imaging apparatus 1 and the electrical contact provided at the mount portion of the optical apparatus 2. Note that, for example, in a case where no electrical contact is provided at each mount portion, wireless communication, such as optical communication, may be performed.

The processing unit 27 storing unique information regarding the optical apparatus 2, is capable of transmitting the unique information to the processing unit 14. After receiving the unique information, the processing unit 14 recognizes that the optical apparatus 2 has been mounted on the imaging apparatus 1. The unique information regarding the optical apparatus 2 includes information regarding the lens array 21 and the filter array 22. The information regarding the lens array 21 and the filter array 22 includes, for example, an identifier (ID), such as an identification number regarding each of the lens array 21 and the filter array 22, or an identifier regarding a combination of the lens array 21 and the filter array 22. The processing unit 14 is capable of recognizing the classification or individual of the optical apparatus 2, on the basis of the received unique information.

In the image pickup system 100 according to the present embodiment, the imaging apparatus 1 includes a power source, whereas the optical apparatus 2 includes no power source. Thus, the processing unit 14 in the imaging apparatus 1, recognizes mounting of the optical apparatus 2. In this case, the processing unit 27 has a function only as the storage unit (communication unit) storing the unique information. Note that, in a case where the processing unit 14 and the processing unit 27 perform wireless communication, the imaging apparatus 1 and the optical apparatus 2 may be provided with respective power sources so that each performs recognition individually.

The processing unit 14 also has a function as an image processing unit (processor), and processes image information output from the image pickup element 11, in accordance with the received unique information. In this case, information regarding the lens array 21 (e.g., the number of lens portions or arrangement) and information regarding the filter array 22 (e.g., the transmission characteristic of each filter or arrangement) in the optical apparatus 2, linked with the unique information, are recorded in advance as a data table on the processing unit 14 or an external device. This arrangement enables the processing unit 14 to recognize what type of configuration (characteristic) the mounted optical apparatus 2 has, with collation of the received unique information with the data table.

Note that, as necessary, the information regarding the lens array 21 and the information regarding the filter array 22 as described above may be recorded in advance as the unique information on the processing unit 27, and then the processing unit 14 may acquire the information from the processing unit 27. Note that, for simplification and miniaturization of the optical apparatus 2, information to be recorded on the processing unit 27 includes minimum information, such as an identification number for discriminating the classification or individual of the optical apparatus 2 as described above.

Note that transmission of image information output from the image pickup element 11 to the external device, may cause the external device to perform the image processing as described above, instead of the processing unit 14. In this case, for clarification of the correspondence relationship between the information regarding the optical apparatus 2 and the image information, the image information to which the information stored in the processing unit 27 has been added, is transmitted to the external device. Alternatively, the processing unit 27 may be provided as the external device outside the imaging apparatus 1.

As described above, in the image pickup system 100 according to the present embodiment, the lens array 21 and the filter array 22 integrally held are detachably mountable to the imaging apparatus 1, so that a plurality of favorable pieces of image information can be acquired simultaneously. Particularly, replacement of the lens array 21 and the filter array 22 enables acquisition of various types of image information different in the number of bands or resolution.

Second Embodiment

An image pickup system 200 according to a second embodiment of the disclosure will be described below. The description in equivalent configuration between the image pickup system 200 according to the present embodiment and the image pickup system 100 according to the first embodiment described above, will be omitted.

Figure 3B:
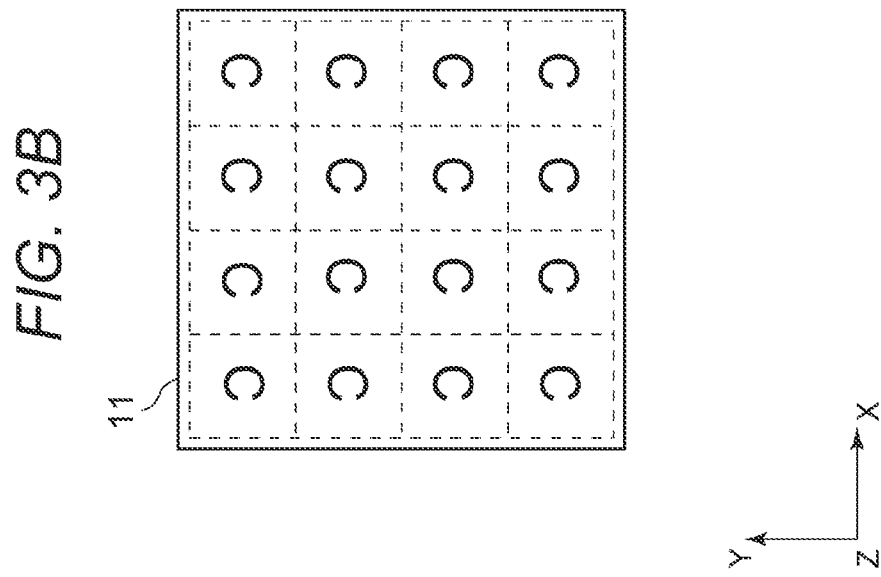
FIG. 3B is a front view of an image pickup surface of the image pickup system according to the second embodiment.
Figure 3A:
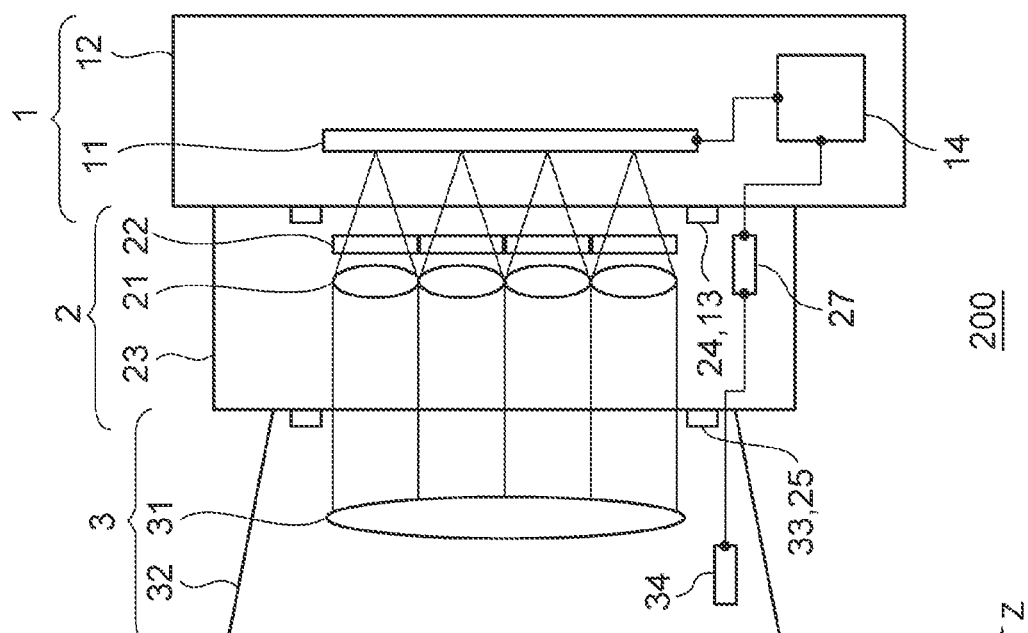
FIG. 3A is a main schematic view of an image pickup system according to a second embodiment (YZ cross section).

FIGS. 3A and 3B are main schematic views (exemplary views) of the image pickup system 200 according to the present embodiment. FIG. 3A illustrates a cross section including part of the optical axes of a plurality of lens portions. FIG. 3B is a front view of an image pickup surface when viewed in the −Z direction. The image pickup system 200 is different from the image pickup system 100 in terms of the configuration of a lens array 21 and a filter array 22 in an optical apparatus 2 and in that a lens apparatus (lens unit) 3 is mounted on the object side of the optical apparatus 2.

In the optical apparatus 2 according to the present embodiment, the lens array 21 consists of 16 lens portions, and the filter array 22 consists of 16 filters corresponding to the respective lens portions. That is the optical apparatus 2 includes 16 image forming units, and the image forming units form 16 images on the image pickup surface of an image pickup element 11. In this manner, the number of image forming units and arrangement are different between the first embodiment and the second embodiment. However, use of the image pickup element 11 common to the image forming units, enables acquisition of favorable image information without change of the configuration of an imaging apparatus 1.

The lens apparatus 3 includes: an optical system 31 including one lens or more common to the image forming units of the optical apparatus 2; and a holding member (lens barrel) 32 holding the optical system 31. The holding member 32 includes a mount portion 33 for coupling with a second mount portion 25 of the optical apparatus 2. This arrangement enables the lens apparatus 3 to be detachably mounted onto the optical apparatus 2 via the mount portion 33. Note that the present embodiment is not limited to this configuration as long as the relative position between the lens array 21, the filter array 22, and the optical system 31 can be determined. For example, provision of an opening (hole) to a holding member 23 of the optical apparatus 2 may enable the lens apparatus 3 to be directly mounted onto the imaging apparatus 1 through the opening.

The lens apparatus 3 according to the present embodiment, serves to convert the angle of view of the image pickup system 200 (angle of view of image pickup). That is replacement of the lens apparatus 3 with a lens apparatus different in the configuration of the optical system 31, enables acquisition of image information corresponding to various angles of view. Note that, in a case where, with no lens apparatus 3, the lens portions consist of a plurality of lens groups and the interval between adjacent lens groups is changeable, the angle of view of the image pickup system 200 can be changed. However, in that case, the degree of difficulty in producing and controlling the lens array 21 is high, and the configuration of the optical apparatus 2 is intricate and large in size.

Therefore, for simplification and miniaturization of the optical apparatus 2, as in the present embodiment, replacement of the lens apparatus 3 enables change of the angle of view of the image pickup system 200. Note that the optical system 31 in the lens apparatus 3 may consist of at least one lens movable for focus adjustment (focusing). Change of the interval between adjacent lens groups in the optical system 31 consisting of a plurality of lens groups, may change the focal length of the image pickup system 200 for adjustment of the angle of view or adjustment of image-forming magnification.

Note that, in a case where the focal position of each lens portion in the lens array 21 agrees with the image pickup surface of the image pickup element 11, light from the object located at an infinite distance into the lens array 21 results in parallel light. Therefore, the optical system 31 in the lens apparatus 3 is provided as a collimating optical system such that the optical system 31 guides parallel light to the lens array 21. This configuration enables image-forming performance to be inhibited from varying in a case where the lens apparatus 3 shifts vertically to the optical axis due to a mounting error at each mount portion.

Note that, in a case where the lens apparatus 3 is removed from this configuration, namely, in a case where the imaging apparatus 1 having only the optical apparatus 2 mounted thereon performs image pickup as in the first embodiment, the object located at a short distance is out of focus, so that a captured image blurs. Therefore, a mechanism for varying the relative position between the lens array 21 and the image pickup element 11 as described above is provided in this configuration so that focusing can be performed.

In one embodiment, the lens apparatus 3 includes a processing unit 34 similar to a processing unit 27 in the optical apparatus 2. The processing unit 34 storing unique information regarding the lens apparatus 3, is capable of transmitting the unique information to a processing unit 14 in the imaging apparatus 1 via the processing unit 27 in the optical apparatus 2 or directly. The processing unit 14 is capable of recognizing the classification or individual of the lens apparatus 3, on the basis of the unique information regarding the lens apparatus 3. The processing unit 14 is capable of processing image information output from the image pickup element 11, in accordance with the unique information regarding at least one of the lens apparatus 3 and the optical apparatus 2.

Third Embodiment

An image pickup system 300 according to a third embodiment of the disclosure will be described below. The description in equivalent configuration between the image pickup system 300 according to the present embodiment and the image pickup system 200 according to the second embodiment described above, will be omitted.

Figure 4A:
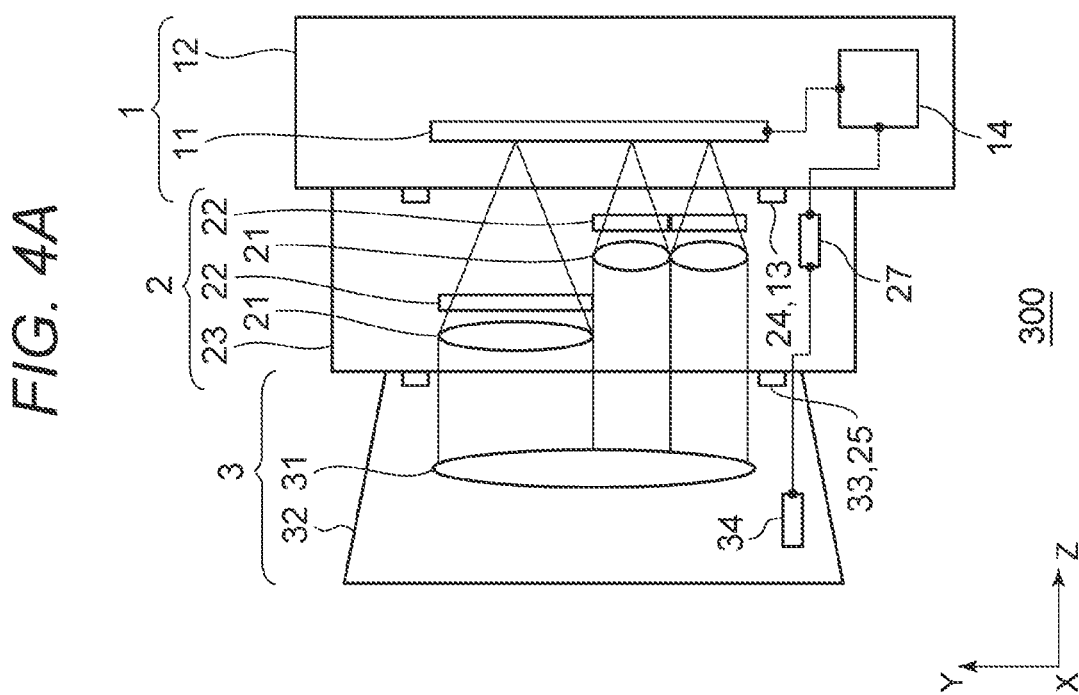
FIG. 4A is a main schematic view of an image pickup system according to a third embodiment (YZ cross section).
Figure 4B:
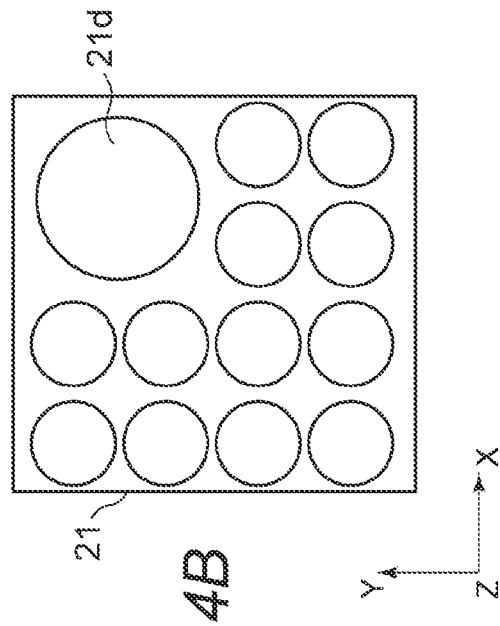
FIG. 4B is a front view of a lens array of the image pickup system according to the third embodiment.
Figure 4C:
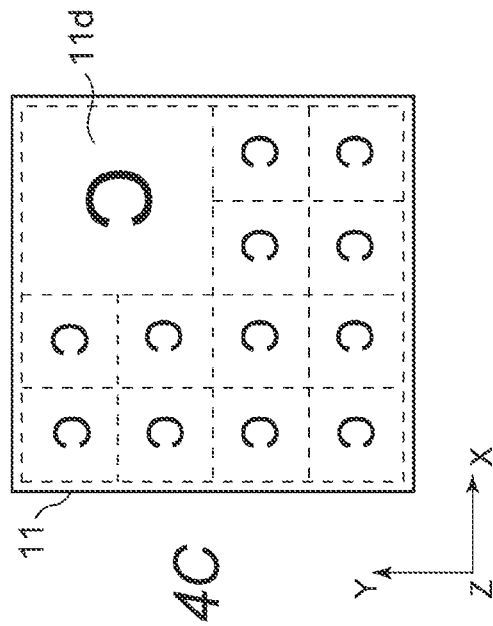
FIG. 4C is a front view of an image pickup surface of the image pickup system according to the third embodiment.

FIGS. 4A to 4C are main schematic views (exemplary views) of the image pickup system 300 according to the present embodiment. FIG. 4A illustrates a cross section including part of the optical axes of a plurality of lens portions. FIG. 4B is a front view of a lens array 21. FIG. 4C is a front view of an image pickup surface. The image pickup system 300 is different from the image pickup system 200 in terms of the number of lens portions of which the lens array 21 consists and the size and arrangement of part of the lens portions.

In an optical apparatus 2 according to the present embodiment, the lens array 21 consists of 13 lens portions, and a filter array 22 consists of 13 filters corresponding to the lens portions. That is the optical apparatus 2 includes 13 image forming units, and the image forming units form 13 images on the image pickup surface of an image pickup element 11. As illustrated in FIG. 4B, a lens portion 21d is larger in size than the other lens portions in the lens array 21 according to the present embodiment. Specifically, the lens portion 21d according to the present embodiment is disposed occupying the region in which four lens portions are disposed in the lens array 21 according to the second embodiment.

According to the present embodiment, each lens portion doubles as an aperture stop. The brightness of each image forming unit (F number) is determined by the size of each lens portion (effective diameter). Therefore, an image that the lens portion 21d forms is larger in the amount of light than respective images that the other lens portions form. In this manner, change of the size of part of the lens portions in the lens array 21 enables acquisition of image pickup information including a plurality of different pieces of light amount information, by a one-time image pickup. Note that, other than the lens portion 21d, a lens portion having an effective diameter different in size may be provided.

According to the present embodiment, because the lens portion 21d is larger in size than the other lens portions, the lens portion 21d is made larger in focal length than the other lens portions. In addition, as illustrated in FIG. 4A, the lens portion 21d is disposed on the object side with respect to the other lens portions. Thus, as illustrated in FIG. 4C, an image 11d formed by the lens portion 21d is larger than respective images formed by the other lens portions. Therefore, in a case where the image pickup element 11 is uniform in pixel density, the image 11d is higher in resolution than the other images. Therefore, this configuration enables acquisition of image pickup information including a plurality of different resolutions, by a one-time image pickup.

For example, in a case where the filter array 22 consists of a plurality of bandpass filters mutually different in bandwidth, a bandpass filter corresponding to a long wavelength band in which aberration correction is relatively difficult to perform, is disposed on the optical axis of the lens portion 21d, so that sufficient resolution can be secured. Alternatively, with no filter disposed on the optical axis of the lens portion 21d, the lens portion 21d may be specialized in acquisition of luminosity information (luminosity distribution). In this case, on the basis of the luminosity information acquired from the image 11d, for example, correction of the dynamic range of image information acquired from the other images or super-resolution processing with sub-pixel information can be performed.

Fourth Embodiment

An image pickup system 400 according to a fourth embodiment of the disclosure will be described below. The description in equivalent configuration between the image pickup system 400 according to the present embodiment and the image pickup system 100 according to the first embodiment described above, will be omitted.

FIGS. 5A and 5B are main schematic views (exemplary views) of the image pickup system 400 according to the present embodiment. FIG. 5A illustrates a cross section including part of the optical axes of a plurality of lens portions. FIG. 5B is a front view of an image pickup surface. The image pickup system 400 is different from the image pickup system 100 in that a lens apparatus 3 and an adaptor apparatus (adaptor unit) 4 are mounted on the object side of an optical apparatus 2.

Similarly to the respective lens apparatus 3 according to the second embodiment and the third embodiment, the lens apparatus 3 according to the present embodiment includes an optical system 31 including one lens or more, and a holding member 32 holding the optical system 31. However, differently from the respective optical systems 31 according to the second embodiment and the third embodiment, the optical system 31 according to the present embodiment condenses light from the object, to form an intermediate image of the object.

The adaptor apparatus 4 according to the present embodiment includes: a diffusing element 41 that diffuses light; an optical system 42 including one lens or more; and a holding member 43 holding the diffusing element 41 and the optical system 42. The diffusing element 41 disposed at the position of an intermediate image plane (primary image-forming plane) that the lens apparatus 3 forms, serves as a screen. Examples of the diffusing element 41 that can be adopted, include a diffusing member (diffusing plate) having a diffusing surface (rough surface) and a microlens array consisting of a plurality of minute lenses. The optical system 42 has a function as a collimating optical system that converts light from the diffusing element 41 into parallel light.

The holding member 43 in the adaptor apparatus 4 includes: a mount portion 44 for coupling with a second mount portion 25 of the optical apparatus 2; and a mount portion 45 for coupling with a mount portion 33 of the lens apparatus 3. This arrangement enables the adaptor apparatus 4 to be detachably mounted onto the optical apparatus 2 and the lens apparatus 3 via the mount portions. In this case, even in a case where the lens apparatus 3 is not allowed to be detachably mounted directly onto an imaging apparatus 1 and the optical apparatus 2, the lens apparatus 3 can be detachably mounted indirectly via the adaptor apparatus 4.

In one embodiment, a first mount portion 24 of the optical apparatus 2 is identical in shape to the mount portion 33 of the lens apparatus 3, and a mount portion 13 of the imaging apparatus 1 is identical in shape to the mount portion 45 of the adaptor apparatus 4. In other words, the lens apparatus 3 detachably mountable to the imaging apparatus 1, is detachably mountable to the adaptor apparatus 4. This arrangement enables achievement of an image pickup system capable of simultaneously acquiring a plurality of pieces of image information by a one-time image pickup, with the imaging apparatus 1 as a general camera and the lens apparatus 3 as a general interchangeable lens.

In the image pickup system 400 according to the present embodiment, the adaptor apparatus 4 causes parallel light to enter the optical apparatus 2, similarly to the image pickup system 200 according to the second embodiment and the image pickup system 300 according to the third embodiment. This arrangement enables application of the optical apparatus 2 according to the present embodiment to a lens apparatus that forms no intermediate image of the object, as in the second embodiment or the third embodiment. Therefore, in order to secure the compatibility between the optical apparatus 2, the lens apparatus 3, and the adaptor apparatus 4, the respective mount portions of the apparatuses are identical in shape regardless of the configuration of each optical system.

Note that, for use of a lens apparatus that forms an intermediate image of the object, similarly to the lens apparatus 3 according to the present embodiment, a field stop is disposed at the position of the intermediate image plane thereof. This arrangement enables appropriate setting of the shape or size of the boundary of each image to be formed on the image pickup surface of an image pickup element 11. For example, in a case where light from each image forming unit interferes with those from the others, an aperture provided at the field stop is at least to decrease in size (aperture diameter). In this case, in order to improve the use efficiency of the image pickup element 11, the shape of the aperture of the field stop is, for example, a rectangle enabling equal segmentation of the image pickup surface.

The boundary of each image on the image pickup surface gets sharper as the field stop comes closer to the position of the intermediate image plane. In a case where the diffusing element 41 is disposed at the position of the intermediate image plane as in the present embodiment, the field stop is disposed in contact with the diffusing element 41. In this case, for the diffusing element 41 having a thickness, in order to reduce the influence of scattering inside the diffusing element 41, the field stop is disposed on the object side of the diffusing element 41. According to the present embodiment, as illustrated in FIG. 5A, a light-shielding member (light-shielding paint) is provided to the portion excluding the central portion (rectangular portion) in the diffusing element 41, so that the diffusing element 41 has a function as a field stop. Alternatively, the diffusing element 41 may be disposed at an aperture portion provided at a light-shielding member of which a field stop consists, for integration of the field stop and the diffusing element 41.

In a case where the diffusing element 41 is disposed at the position of the intermediate image plane, because light from the lens apparatus 3 is diffused by the diffusing element 41, information regarding the incident angle of the light from the lens apparatus 3 is lost. Thus, parallax can be inhibited from occurring in each image. Note that, in a case where the image pickup system 400 according to the present embodiment is used as a ranging apparatus as described later, because information regarding the distance to the object is acquired with the parallax of each image, the information regarding the incident angle of the light from the lens apparatus 3 is kept. In that case, instead of the diffusing element 41, a positive lens is disposed as a field lens immediately in front of the field stop, so that a function similar to that according to the present embodiment can be achieved, keeping the information regarding the incident angle.

As illustrated in FIG. 5A, the adaptor apparatus 4 includes a processing unit 46 similar to a processing unit 27 in the optical apparatus 2. The processing unit 46 storing unique information regarding the adaptor apparatus 4, is capable of transmitting the unique information to a processing unit 14 in the imaging apparatus 1 through the processing unit 27 in the optical apparatus 2 or directly. The processing unit 14 is capable of recognizing the classification or individual of the adaptor apparatus 4, on the basis of the unique information regarding the adaptor apparatus 4. The processing unit 14 is capable of processing image information output from the image pickup element 11, in accordance with the unique information regarding at least one of the lens apparatus 3, the adaptor apparatus 4, and the optical apparatus 2. In this case, the influence of aberration generated by the lens apparatus 3 to the image information, may be corrected with the unique information regarding the lens apparatus 3.

Here, in the image pickup system 400 according to the present embodiment, the object subjected to image forming by the lens apparatus 3 is further subjected to image forming by the optical apparatus 2. Thus, as illustrated in FIG. 5B, an erect image is formed on the image pickup surface according to the present embodiment. Therefore, information for discrimination of whether an image to be formed on the image pickup surface is an inverted image or an erect image is available so that the processing unit 14 in the imaging apparatus 1 processes image information appropriately.

Therefore, the processing unit 46 of the adaptor apparatus 4 stores in advance information for determining the presence or absence of inversion of an image. For example, on the premise that a lens apparatus that forms an intermediate image of the object is only mounted on the adaptor apparatus 4, the processing unit 46 at least stores in advance information for determining that an image of the object has been subjected to image forming once (inverted). Note that, if each image forming unit in the optical apparatus 2 performs image forming of the object a plurality of times, the processing unit 27 at least stores in advance information regarding inversion of an image.

[Ranging Apparatus]

Use of the image pickup system according to each embodiment described above as a ranging apparatus, such as an in-vehicle camera or a monitoring camera, will be described below.

The optical axis of each lens portion of which the lens array 21 consists in the optical apparatus 2 is spaced apart from those of the others in at least one direction of the X direction and the Y direction. Thus, parallax occurs between the respective images formed by the lens portions. Therefore, on the basis of information regarding the parallax (parallax information), the processing unit 14 of the imaging apparatus 1 or an external device can acquire information regarding the distance to the object (distance information). Note that the distance information herein means information regarding the relative position to the object, such as the interval to the object, the amount of defocus, or the amount of image shifting. The distance information may directly indicate the distance value of the object in image information or may indirectly indicate information corresponding to the distance value.

For example, bandpass filters having mutually identical transmissive wavelength regions are provided as any two filters in the filter array 22 illustrated in FIG. 1B, so that a pair of the image forming units including the bandpass filters functions as a stereo optical system (distance-measuring optical system). That is the image pickup system 100 illustrated in FIG. 1A functions as a stereo camera (ranging apparatus). Therefore, on the basis of parallax information regarding a stereo image formed by the pair of the image forming units, distance information regarding the object can be acquired.

Note that the pair of the image forming units as the stereo optical system may be arrayed horizontally (X direction), vertically (Y direction), or obliquely. Note that, because the accuracy of distance measurement improves as the parallax of the stereo image increases, a pair of image forming units spaced farthest in the plurality of image forming units, is used as the stereo optical system. Not only one pair of image forming units but also another pair of image forming units may be used for distance measurement. In a case where a plurality of objects disposed in the depth direction (Z direction) are to be measured in distance, occlusion in which information regarding the object behind the near object is insufficient, occurs as an issue. Thus, a set of three image forming units or more is used for distance measurement.

Modification

The embodiments of the disclosure have been described above. However, the disclosure is not limited to the embodiments. Thus, various combinations, modifications, and alternations may be made without departing from the scope of the spirit of the disclosure.

According to each embodiment described above, the case where each lens portion doubles as an aperture stop, namely, the case where the effective diameter of each lens portion is determined by the lens portion itself has been described. However, a separate member may be provided as the aperture stop. For one image forming unit, in a case where the lens portion includes a plurality of lenses and in a case where the filter includes a plurality of filter elements, the lenses and the filter elements may be alternately disposed in the optical-axis direction.

Furthermore, adopted may be an image forming unit including a plurality of filters disposed such that the pupil of a lens portion is segmented in XY cross section. In this case, provision of a microlens array in the region corresponding to the image forming unit, on the image pickup surface, enables use of the image pickup system as a plenoptic camera. This configuration enables acquisition of a larger number of pieces of image information because light having passed through the pupil of one lens portion is separated to enter mutually different pixels on the image pickup surface.

In the image pickup system according to the second, third, or fourth embodiment described above, the optical apparatus 2 and the lens apparatus 3 or the adaptor apparatus 4 are mutually detachably mountable. However, as necessary, the apparatuses may be integrally formed to inhibit a mounting error from occurring between the apparatuses. For example, the optical apparatus 2 and the lens apparatus 3 may be integrally formed or the optical apparatus 2, the lens apparatus 3, and the adaptor apparatus 4 may be integrally formed as one lens apparatus (accessory apparatus) detachably mountable to the imaging apparatus 1. Alternatively, the optical apparatus 2 and the adaptor apparatus 4 may be integrally formed as one adaptor apparatus (accessory apparatus) detachably mountable to the imaging apparatus 1 and the lens apparatus 3.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An optical apparatus comprising:
    a plurality of lens portions configured to form respective images of an object;
    a plurality of filters disposed on respective optical axes of the plurality of lens portions;
    an optical element that is common to the plurality of lens portions and guides light from the object to the plurality of lens portions; and
    a holding member holding the plurality of lens portions, the plurality of filters, and the optical element integrally,
    wherein the plurality of filters includes a first filter and a second filter mutually different in transmission characteristic,
    wherein the holding member includes a first mount portion and a second mount portion,
    wherein the optical apparatus is detachably mountable to an imaging apparatus via the first mount portion, and is detachably mountable to an accessory apparatus via the second mount portion, and
    wherein the accessory apparatus is detachably mountable to the imaging apparatus.

2. The optical apparatus according to claim 1, wherein the first mount portion includes an electrical contact for electrical connection with the imaging apparatus.

3. The optical apparatus according to claim 1, further comprising:
    a communication unit configured to transmit information regarding the plurality of lens portions and the plurality of filters to the imaging apparatus.

4. The optical apparatus according to claim 1, wherein the first filter outputs light at a first wavelength, and the second filter outputs light at a second wavelength.

5. The optical apparatus according to claim 1, wherein the first filter outputs light in a first polarization state, and the second filter outputs light in a second polarization state.

6. The optical apparatus according to claim 1, wherein the plurality of filters is mutually different in transmission characteristic.

7. The optical apparatus according to claim 1, wherein the plurality of filters includes two or more filters mutually identical in transmission characteristic.

8. The optical apparatus according to claim 1, wherein the second mount portion includes an electrical contact for electrical connection with the accessory apparatus.

9. The optical apparatus according to claim 1, wherein the accessory apparatus includes an optical system that is common to the plurality of lens portions and guides light from the object into the optical element.

10. The optical apparatus according to claim 1, wherein the optical element converts the light from the object into parallel light and guides the parallel light to the plurality of lens portions.

11. The optical apparatus according to claim 9, wherein the optical system forms an intermediate image of the object.

12. The optical apparatus according to claim 11, wherein a field stop is provided at a position of the intermediate image of the object.

13. The optical apparatus according to claim 12, wherein a diffusing element is provided at an aperture portion of the field stop.

14. The optical apparatus according to claim 1, wherein the optical element is a diffusing element.

15. The optical apparatus according to claim 1, wherein the plurality of lens portions includes two or more lens portions mutually different in effective diameter.

16. An image pickup system comprising:
the optical apparatus according to claim 1; and
the imaging apparatus on which the optical apparatus is mounted.

17. The image pickup system according to claim 16, further comprising:
a processor configured to process image information acquired by the imaging apparatus, based on information regarding the plurality of lens portions and the plurality of filters.

* * * * *